US009330090B2

(12) United States Patent
Gulwani et al.

(10) Patent No.: US 9,330,090 B2
(45) Date of Patent: May 3, 2016

(54) TRANSLATING NATURAL LANGUAGE DESCRIPTIONS TO PROGRAMS IN A DOMAIN-SPECIFIC LANGUAGE FOR SPREADSHEETS

(71) Applicant: Microsoft Corporation, Redmond, WA (US)

(72) Inventors: Sumit Gulwani, Bellevue, WA (US); Mark Marron, Davis, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 379 days.

(21) Appl. No.: 13/753,507

(22) Filed: Jan. 29, 2013

(65) Prior Publication Data

US 2014/0214399 A1 Jul. 31, 2014

(51) Int. Cl.
*G06F 17/27* (2006.01)
*G06F 17/28* (2006.01)
*G06F 17/24* (2006.01)
*G06F 9/44* (2006.01)

(52) U.S. Cl.
CPC *G06F 17/28* (2013.01); *G06F 8/10* (2013.01); *G06F 17/246* (2013.01)

(58) Field of Classification Search
CPC ..................................................... G06F 17/28
See application file for complete search history.

(56) References Cited

U.S. PATENT DOCUMENTS 5,175,814 A * 12/1992 Anick et al. .................. 715/835
5,584,024 A * 12/1996 Shwartz
5,729,659 A * 3/1998 Potter ........................... 704/270
5,734,889 A    3/1998 Yamaguchi
5,995,918 A * 11/1999 Kendall et al. .................... 704/1
7,613,719 B2   11/2009 Chang et al.
7,765,097 B1   7/2010 Yu et al.
8,091,024 B2   1/2012 Graeber
8,589,869 B2 * 11/2013 Wolfram ................... G06F 8/30
                                                 707/723

(Continued)

FOREIGN PATENT DOCUMENTS

EP            1577797 A2     9/2005

OTHER PUBLICATIONS

Kay, "Computer Software", Scientific American, vol. 251, No. 3, Sep. 1984.*

(Continued)

*Primary Examiner* — Brian Albertalli
(74) *Attorney, Agent, or Firm* — Alin Corie; Sandy Swain; Micky Minhas

(57) ABSTRACT

A system and method to translate natural language descriptions to programs in a domain-specific language for spreadsheets. The method includes generating a model of a spreadsheet. The model includes a column description for each column, and one or more types associated with each column. The method also includes normalizing the description by removing stop words, and replacing parts that match column names or data values by parameterized place-holders. The method involves applying rule-based translation along with keyword or type-based program synthesis in an inter-leaved, bottom-up manner and dynamic programming style, where phrases are mapped to sub-programs in increasing order of their length. The rules describe how to map a specific partial natural language phrase into a partial sub-program. Also, the method includes generating a number of potential programs and ranking the programs to sequence them according to their intended likelihood.

20 Claims, 9 Drawing Sheets

(56) References Cited

U.S. PATENT DOCUMENTS

| | | | |
|---|---|---|---|
| 8,812,298 B1* | 8/2014 | Wolfram et al. | 704/9 |
| 2002/0032564 A1* | 3/2002 | Ehsani et al. | 704/235 |
| 2003/0004704 A1* | 1/2003 | Baron | 704/8 |
| 2005/0043940 A1* | 2/2005 | Elder | G06F 17/3043 704/9 |
| 2005/0272415 A1* | 12/2005 | McConnell et al. | 455/418 |
| 2006/0069696 A1* | 3/2006 | Becker et al. | 707/102 |
| 2007/0192083 A1* | 8/2007 | Ivanov et al. | 704/1 |
| 2008/0168341 A1* | 7/2008 | Payette | 715/212 |
| 2009/0112787 A1* | 4/2009 | Ginzberg | 706/47 |
| 2011/0115702 A1 | 5/2011 | Seaberg | |
| 2012/0136649 A1* | 5/2012 | Freising et al. | 704/9 |
| 2012/0173476 A1 | 7/2012 | Rizvi | |
| 2012/0303645 A1* | 11/2012 | Kulkarni-Puranik | G06F 17/2229 707/756 |
| 2013/0013616 A1* | 1/2013 | Leidner | G06F 17/30401 707/742 |
| 2013/0125094 A1* | 5/2013 | Wolfram | G06F 8/30 717/109 |
| 2013/0166530 A1* | 6/2013 | Pilat | G06F 17/30873 707/708 |
| 2013/0185050 A1* | 7/2013 | Bird et al. | 704/2 |
| 2014/0173400 A1* | 6/2014 | Mingot et al. | 715/212 |
| 2014/0207790 A1* | 7/2014 | Diament | G06F 17/30979 707/748 |

OTHER PUBLICATIONS

Napier, H. Albert, et al. "Impact of a restricted natural language interface on ease of learning and productivity." Communications of the ACM 32.10 (1989): 1190-1198.*

"International Search Report & Written Opinion for PCT Patent Application No. PCT/US2014/012412", Mailed Date: Oct. 23, 2014, 8 Pages.

Gulwani, et al., "Spreadsheet Data Manipulation Using Examples", Retrieved at <<http://research.microsoft.com/en-us/um/people/sumitg/pubs/cacm12-synthesis.pdf>>, Communications of the ACM, vol. 55, No. 8, Aug. 2008, pp. 9.

Ko, et al., "The State of the Art in End-User Software Engineering", Retrieved at <<http://web.media.mit.edu/~lieber/Publications/End-User-Software-Engineering.pdf>>, Journal of ACM Computing Surveys (CSUR), vol. 43, Issue 3, Apr. 2011, pp. 61.

* cited by examiner

108 — COMMAND: ADD THE OTPAY AND THE BASEPAY

APPLY | UNDO | ALTERNATIVE CHOICES: ● BEST ○ ALT1 ○ ALT2 ○ NONE

| | A | B | C | D | E | F | G | H | I |
|---|---|---|---|---|---|---|---|---|---|
| 1 | LOCATION | NAME | TITLE | PAY | HOURS | OTHOURS | OTPAY | BASEPAY | TOTALPAY |
| 2 | CAPITOL HILL | AARON SAGE | CHEF | $13.50 | 18 | 0 | $0.00 | $243.00 | $243.00 |
| 3 | CAPITOL HILL | BLANCA GOMEZ | CASHIER | $7.75 | 25 | 0 | $0.00 | $193.75 | $193.75 |
| 4 | CAPITOL HILL | CHRIS WU | MANAGER | $24.75 | 40 | 10 | $371.25 | $990.00 | $1,361.25 |
| 5 | CAPITOL HILL | DEERAJ MANDAR | BARISTA | $8.80 | 40 | 0 | $0.00 | $352.00 | $352.00 |
| 6 | CAPITOL HILL | EJ EMEAGWALI | CASHIER | $7.75 | 22 | 0 | $0.00 | $170.50 | $170.50 |
| 7 | CAPITOL HILL | FERNANDO CREZ | BARISTA | $8.80 | 40 | 0 | $0.00 | $352.00 | $352.00 |
| 8 | CAPITOL HILL | GRACE LIU | BARISTA | $8.80 | 21 | 0 | $0.00 | $184.80 | $184.80 |
| 9 | CAPITOL HILL | HANNA ELSEN | CASHIER | $7.75 | 40 | 3 | $34.88 | $310.00 | $344.88 |
| 10 | QUEEN ANNE | IRENE UNCERTA | MANAGER | $24.75 | 40 | 5 | $180.63 | $990.00 | $1,175.63 |
| 11 | QUEEN ANNE | JEN SENG | CHEF | $13.50 | 16 | 0 | $0.00 | $216.00 | $216.00 |
| 12 | QUEEN ANNE | KORI BERTUN | BARISTA | $8.80 | 26 | 0 | $0.00 | $228.80 | $228.80 |
| 13 | QUEEN ANNE | LIVIA KULK | CASHIER | $7.75 | 22 | 0 | $0.00 | $170.50 | $170.50 |
| 14 | QUEEN ANNE | MARA LYNCH | CASHIER | $7.75 | 40 | 0 | $0.00 | $310.00 | $310.00 |
| 15 | QUEEN ANNE | NICK AGIUS | BARISTA | $8.80 | 34 | 0 | $0.00 | $299.20 | $299.20 |
| 16 | QUEEN ANNE | OTTO KURST | BARISTA | $8.80 | 15 | 0 | $0.00 | $132.00 | $132.00 |
| 17 | | | | | | | | | |

WEEKLY PAYROLL

| COL. NAME / VALUE | NAME OR VALUE | DATA TYPE | ENUMERATED VALUE (EV) OR PRIMARY KEY (PK) |
|---|---|---|---|
| TOTALPAY | N | NUMERIC | |
| BASEPAY | N | NUMERIC | |
| CAPITOL HILL | V | STRING | EV |
| AARON SAGE | V | STRING | PK |

TRANSLATING NATURAL LANGUAGE DESCRIPTIONS TO PROGRAMS IN A DOMAIN-SPECIFIC LANGUAGE FOR SPREADSHEETS

BACKGROUND

Spreadsheets are a popular software tool found on many computing devices. Spreadsheets enable a user to organize information in the form of a table. The table includes individual cells of data, arranged in the rows and columns of the table. Each cell can contain various types of data.

Formulas or programs automatically generate results by running specific operations on spreadsheet data. For example, the sum operator is used to sum all values in a column or row of numeric values. Additionally, spreadsheets provide graphical tools, such as charts, based on spreadsheet data. Pie charts, bar charts, graphs, etc. are generated from formulas or programs invoked by the spreadsheet software.

Despite the usefulness of formulas or programs, many spreadsheet users fail to use these tools effectively. Many users lack the expertise to write programs, or may be intimidated by the technology.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter provides a method for translating natural language descriptions to programs in a domain-specific language for spreadsheets. The method includes generating a model of a spreadsheet. The model includes a column description for each column, and one or more types associated with each column. The method also includes normalizing the description based on the model based on removing stop-words and replacing parts of the description that match with column names or data values by specific parameters. The method involves applying rule-based translation along with keyword/type-based program synthesis in an inter-leaved bottom-up manner and dynamic programming style, where phrases are mapped to sub-programs in increasing order of their length. The rules describe how to map a specific partial natural language phrase into a partial sub-program. Also, the method includes generating a number of potential programs and ranking the programs to sequence them according to their intended likelihood.

Additionally, the claimed subject matter includes a computer-readable storage media. The computer-readable storage media includes code configured to direct a processor to generate a model of a spreadsheet. The model includes a column description for each column of the spreadsheet, and one or more types associated with each column. Further, a number of potential programs are generated of a domain-specific description. The domain-specific description includes one or more sub-expressions. The domain-specific description is associated with a program, based on a plurality of rules for a plurality of programs. The rules associate a plurality of domain-specific descriptions with each of a plurality of programs. Additionally, a first of the potential interpretations is presented based on a likelihood the one potential interpretation is associated with the program. Further, a result of the program is presented in association with a selection of one or more columns, wherein the columns are associated with the sub-expressions, and wherein the result is based on the columns.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

FIG. 1 is an exemplary spreadsheet, in accordance with the claimed subject matter;

FIG. 4 is an example model of a spreadsheet, in accordance with the claimed subject matter;

DETAILED DESCRIPTION

Figure 2:
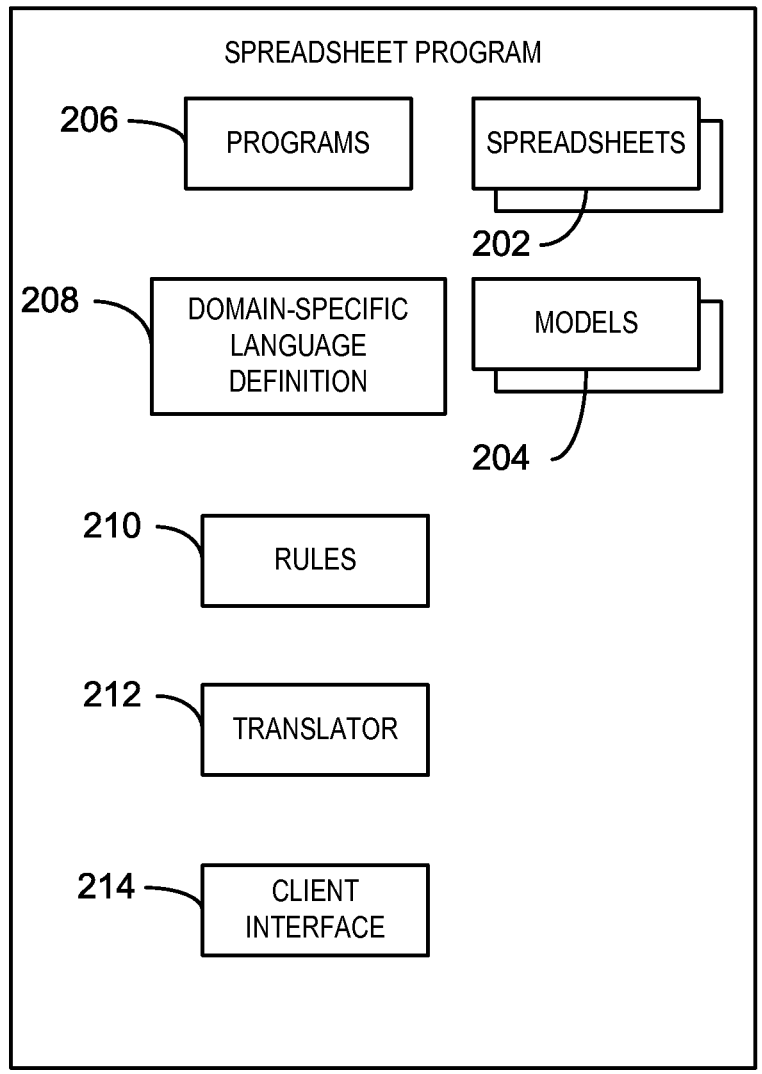
FIG. 2 is a spreadsheet program that translates natural language descriptions to expressions or programs in an underlying domain-specific language, operating in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process and a component can be localized on one computer and/or distributed between two or more computers. The term, processor, is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

One embodiment of the claimed subject matter enables a user to provide a natural language description to incorporate an expression in a spreadsheet. The description uses a language specific to a domain. In this way, a user may reference a single program for the expression by using any of numerous keywords belonging to the domain-specific language. For example, in the financial domain, keywords for performing a summing operation may include: total, add, or sum. As such, the user may reference a program that performs a summing operation by using any of these keywords, and specifying the appropriate cells on which the program can operate.

FIG. 1 is an exemplary spreadsheet 100, in accordance with the claimed subject matter. The spreadsheet 100 includes columns 102 that describe data in each of the rows 104. In one embodiment of the claimed subject matter, a user may click on a cell 106, and provide a natural language description 108 of a task or a program. The spreadsheet software provides feedback on the description 108, giving the user information relevant for corrections, or other possible revisions to the description 108.

In one embodiment, the description translation is performed using a bottom-up dynamic programming process. This process combines (in arbitrary ways) a rule-driven translation and a keyword-driven synthesis procedure. The rule-driven translation is precise, but sensitive to the way a user phrases the description 108. The keyword-driven synthesis procedure is less precise than the rule-driven translation, but has high recall. The non-trivial combination of the two approaches makes the system robust to the structure of the description 108.

Advantageously, this approach can successfully translate descriptions limited to keywords; descriptions with numerous unneeded, erroneous, or irrelevant words; and, even descriptions where the order of the keywords is random. For example, all the following variations of a simple sum command for the spreadsheet 100 can be successfully translated: sum the totalpay for the capitol hill baristas; sum totalpay capitol hill baristas; computer please sum up the totalpay values for the baristas that work at the capitol hill location; for each barista at capitol hill sum their totalpay.

This translation is done without a large set of rules (or training data). Further, the bottom-up dynamic programming process succeeds even when new variations of descriptions 108 are used, and without having seen a similar sentence before in a training set.

FIG. 2 is a spreadsheet program 200 that translates natural language descriptions to expressions or programs in the underlying domain-specific language, operating in accordance with the claimed subject matter. The spreadsheet program 200 is software that facilitates the creation and maintenance of spreadsheets 202. The spreadsheet program 200 also includes spreadsheet models 204, programs 206, domain-specific language definitions 208, pattern rules 210, translator 212, and a client interface 214.

Each spreadsheet 202 may have one corresponding model 204. The spreadsheet models 204 provide contextual information used to translate the description 108 to an expression. The spreadsheet models 204 record column names, column values, and types of data in the spreadsheets 102. The spreadsheet models 204 are described in greater detail with respect to FIG. 4. In one embodiment, the spreadsheet program 200 includes a history (not shown) of the expressions used in the spreadsheet 202. The history provides additional contextual information that can be used to translate the description 108.

Referring back to FIG. 2, the programs 206 are software executed by the spreadsheet program 200 to perform the specific functionality called for in the expressions. The description 108 is translated into expressions/programs 206 in the domain-specific language 208. For example, the second domain may be a macro language, specific to the spreadsheet program 200. In one embodiment, the pattern rules 210 are generated using training data (not shown). The training data provides examples of natural language descriptions 108 of various programs 206. The domain-specific language 208 is extensible, meaning that new constructs may be added, expanding the capability of the spreadsheet program 200 to give a logical or programmatic interpretation to the description 108.

Each of the pattern rules 210 maps a partial natural language phrase to some partial sub-program. For example, an example partial sub-program, AddCS(%2,%1), adds a single value (represented by the parameter, %1) to every number in a column (represented by the parameter, %2). A rule may map the partial natural language phrase "<#add-op> %1 to every value in %2" to the partial sub-program AddCS(%2,%1), where <#add-op> represents any of the keywords for adding (e.g., sum, add, total) operation, %1 represents the value to be added, and %2 represents the list of numbers. The rule 210 also specifies the data type for the parameters. In this example, the data type for both parameters may be numeric. This rule 210 matches a description 108, such as "add 5 to every value in the hours column that is larger than 40," where %1 corresponds to the number, 5, and %2 corresponds to, "the hours column that is larger than 40."

The translator 212 translates the description 108 to an expression using the models 104, definitions 280, and the pattern rules 210. The translator 212 is described in greater detail with respect to FIGS. 3, 5, 6, and 7.

The client interface 214 presents feedback regarding the description 108 and translation. For example, cells that are operated on by the expression may be identified with a highlight. Also, words in the description that are not made use of by the translation engine may be identified. Additionally, several potential translations of the description 108 may be determined and presented on the spreadsheet 100. Each potential translation is a spreadsheet program in the domain-specific language 208. Upon selection of one of the potential translations, the corresponding program is executed on the spreadsheet, with the result being displayed in the cell 106. Advantageously, embodiments of the claimed subject matter enable a user to populate the spreadsheet 100 with programs of varying functionality, by simply providing a natural language description of the program in a domain-specific language.

In one embodiment, the client interface 214 includes a voice recognition engine that is integrated on top of the natural language interface, and touch-based gestures for highlighting relevant cells to be operated on by the program.

Figure 3:
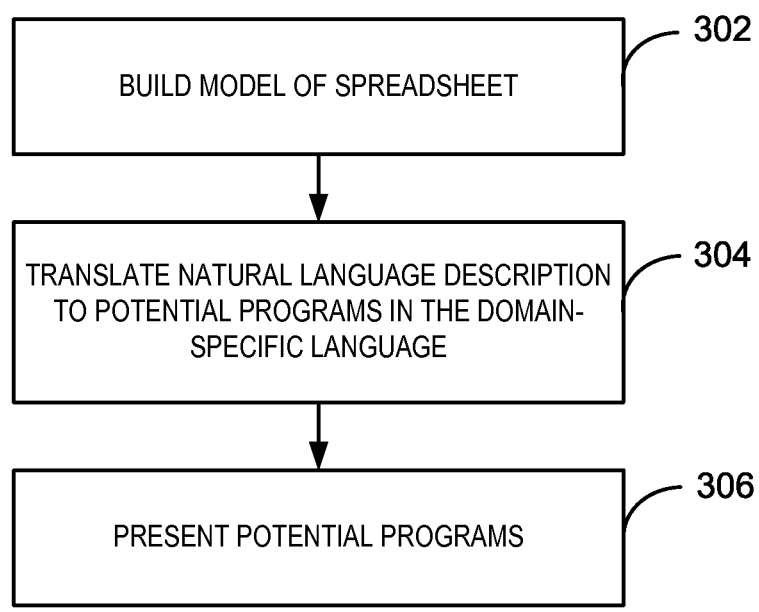
FIG. 3 is a process flow diagram of a method for translating the description to a program, in accordance with the claimed subject matter.

FIG. 3 is a process flow diagram of a method 300 for translating the description 108 to a program, in accordance with the claimed subject matter. It is noted that the process flow diagram is not intended to indicate a particular order of execution. The method 300 begins at block 302, where the model 204 is built for the spreadsheet 202. All values in the spreadsheet 202 are analyzed to identify their types. The types include numeric, string, character, date, currency, and so on. Additional types include whether the values in a column represent a primary key or enumerated values. Enumerated values are a fixed set of values. If a column only includes values from a fixed set, the values are enumerated values. The column headers of the spreadsheet 202 are also stored in the model 204. In one embodiment, the model 204 is generated incrementally as the user makes updates to the spreadsheet 202. The model 204 is described in greater detail with respect to FIG. 4.

Referring back to FIG. 3, at block 304, the description 108 is translated to several potential programs. The translator 212 uses the bottom-up dynamic programming process to identify the potential expressions. This process is described in greater detail with respect to FIG. 5.

Referring back to FIG. 3, at block 306, the client interface 214 presents the potential programs for selection. Additionally, the client interface 214 may present the user an explanation of what each potential program means. In one embodiment, the potential programs may be presented in their syntactic form, or as an equivalent spreadsheet formula. Alternatively, an English (or other language) paraphrasing of the potential program may be presented. Additionally, the potential program may be evaluated, and the spreadsheet cells on which the corresponding program 206 operates may be highlighted. In this way, the user can determine if the translator 212 identified the correct cells for the expression. Another way the potential program can be explained is to evaluate the potential program, i.e., run the corresponding program 206, and display the result in the selected cell.

FIG. 4 is an example model 400 of a spreadsheet 202, in accordance with the claimed subject matter. The model 400 includes column names or values 402, a name or value indicator 404, a data type 406, and an enumerated value or primary key indicator 408. The model 400 includes column names, "TOTALPAY," and "BASEPAY," and, data values, "CAPITOL HILL," and, "AARON SAGE." The data types for values in the spreadsheet 202 include string, numeric, date, currency, and so on. If all the values for a column are unique, the column may represent a primary key. If there are merely a few values, with numerous repetitions between rows, the column may represent an enumerated value. If either of these conditions is met, the indicator 408 may be set accordingly. In all other cases, the indicator 408 may be left blank.

Figure 5:
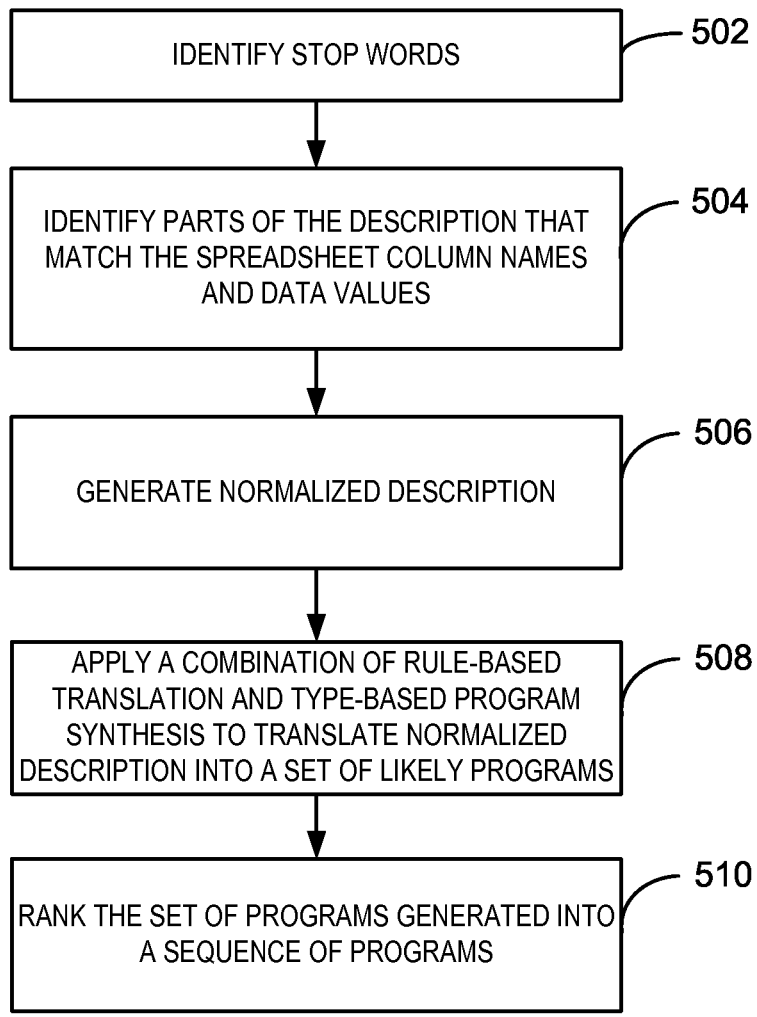
FIG. 5 is a process flow diagram of a method for translating natural language descriptions to programs, in accordance with the claimed subject matter.

FIG. 5 is a process flow diagram of a method 500 for translating natural language descriptions to programs, in accordance with the claimed subject matter. The method 500 may be performed by the translator 212. The method 500 begins at block 502, where the translator identifies stop words in the description 108. Stop words represent any words not recognized by the translator 212.

At block 504, the translator 212 identifies parts of the description that match a column name or the data values in those columns based on the model 204.

At block 506, the translator 212 generates a normalized description. This description is generated to facilitate identifying pattern rules 210 that are applicable. The normalized description is generated by removing the identified stop words from the description 108, and by replacing the identified column names and data values with parameter place holders. The example description, "computer please sum up the totalpay values for the baristas that work at the capitol hill location," includes stop words: computer, please, the, that, work and at; column names: totalpay and location; and, data values: baristas and capitol hill. Accordingly, the template for the example description may be, <#t-sum-op> sum up %1 for (%2=='capitol hill') (%3=='baristas').

At block 508, the translator 212 identifies rules 210 that match with this normalized description. These rules are applied iteratively in a bottom-up manner to perform the translation. This rule-based translation is also mixed with type-based program synthesis to generate likely sub-programs at each level of the translation.

The translator 212 combines two component processes. One process is based on a set of pattern rules for identifying common idioms in natural language commands. This process is generally precise. The other process is based on a type-driven synthesis, which is invariant with respect to specific structure or word-order of user input. The translator 212 combines the process to be arbitrarily interleaved. In other words, the pattern rule process uses the results of the type synthesis and vice versa at any time, during translation.

In one embodiment, the translator 212 uses a dynamic programming algorithm which incrementally fills an interpretation table of all substrings of the natural language description 108, starting with the base-case subsequences of length 1, followed by all subsequences of length 2, and so on, incrementing the length by 1 word each time. At each step, the interpretation algorithm applies the pattern rules 210, using the previously computed values in the table. The translator 212 applies a variation of the type-based synthesis to ensure formulas that were derivable in previous steps are not recomputed. In one embodiment, this is done by tracking the set of words used to derive each formula. During synthesis, the translator 212 is limited to performing derivations that involve word-sets that do not include subsequences of a previous iteration of the translation.

In one embodiment, the translator 212 may use contextual information from the model 204 to fill in missing information in the description. For example, if a spreadsheet only includes one column with numeric data, and the description 108 specifies an add operation, but fails to specify the column name, the translator 212 automatically determines the column to use. At block 510, the translator 212 ranks the potential programs based on relevance to the description, and presents the programs in descending order of relevance.

Figure 6:
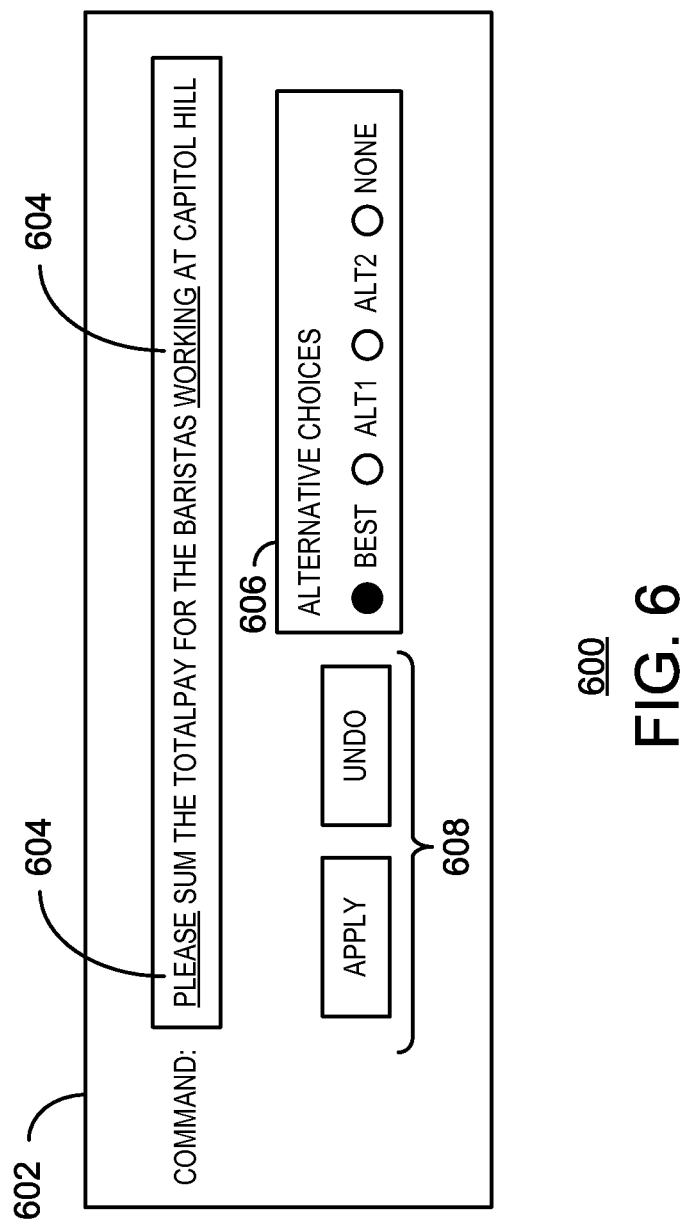
FIG. 6 is a block diagram of an example user interface for translating natural language descriptions to programs, in accordance with the claimed subject matter.

FIG. 6 is a block diagram of an example user interface 600 for translating natural language descriptions to programs, in accordance with the claimed subject matter. The user interface 600 includes a command line 602, stop words 604, alternate choice radio buttons 506, and "Apply," and, "Undo" buttons 608. The stop words 604 are underlined to draw the user's attention to possible issues with the description. The alternate choice radio buttons 506 enable the user to select from among the potential alternate interpretations of the description 108. As such, clicking on Alt1 replaces the current potential program with the next potential program.

In response to pressing the apply button 608, the program is incorporated into the spreadsheet 202. The undo button 608 enables the user to back out a potential program incorporated into the spreadsheet.

Figure 7:
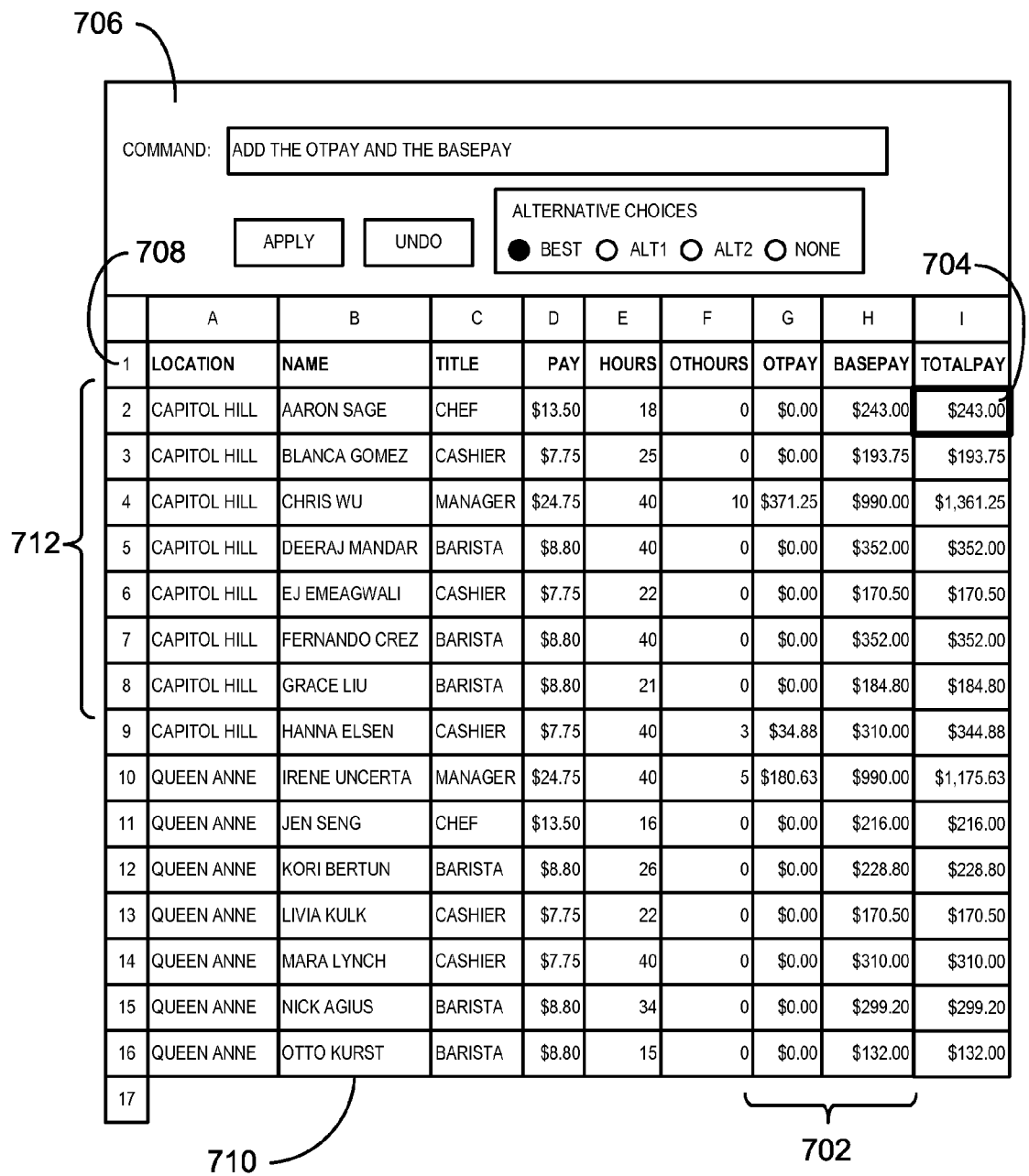
FIG. 7 is a block diagram of an example user interface for translating natural language descriptions to programs to programs in an underlying domain-specific language, in accordance with the claimed subject matter.

FIG. 7 is a block diagram of an example user interface 700 for translating natural language descriptions to programs in the underlying domain-specific language, in accordance with the claimed subject matter. The user interface 700 includes highlighted columns 702, selected cell 704, and potential expression 706. In this example, the user has selected cell 704 when providing the description. The user interface 700 identifies, "Add the OTPAY and the BASEPAY," as the description provided by the user. Upon clicking the apply button, the system generates a set of potential programs, the highest ranked of which is "AddRR(SelectColumn(basepay), SelectColumn(otpay)." When reviewing potential programs, it may be useful to highlight the columns used while executing the program. Columns 702 are accordingly highlighted for the highest-ranked program to enable the user to confirm that the appropriate data is being operated on.

Figure 8:
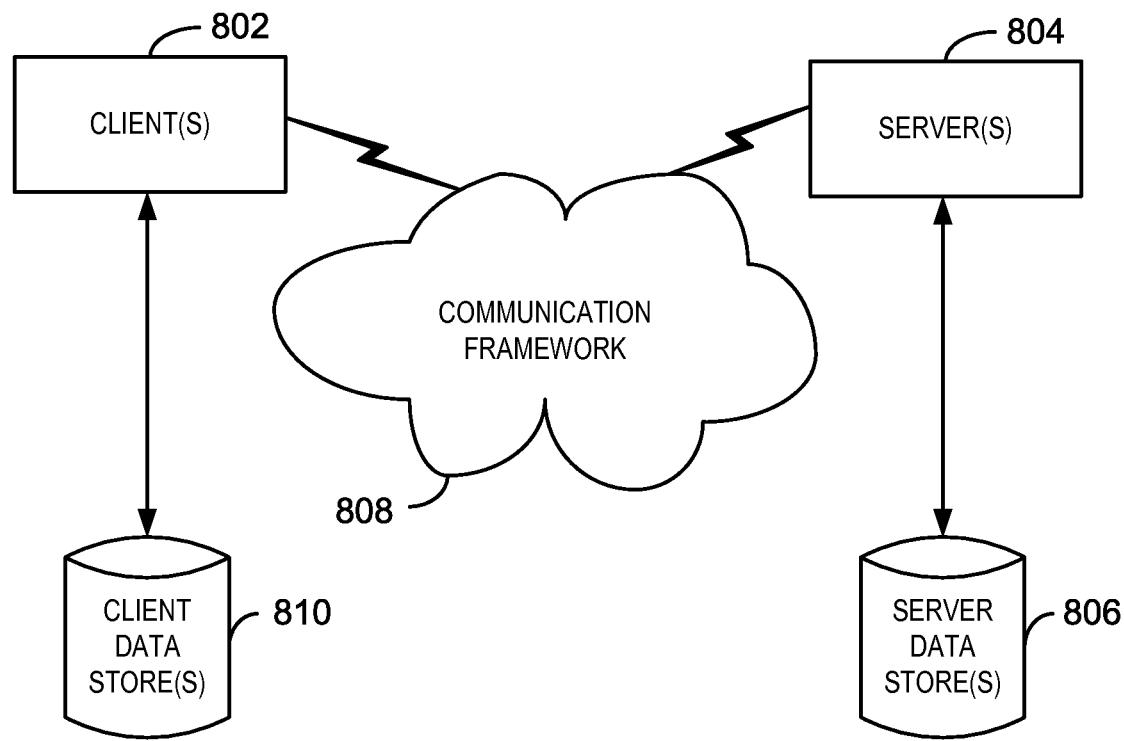
FIG. 8 is a block diagram of an exemplary networking environment wherein aspects of the claimed subject matter can be employed.

FIG. 8 is a block diagram of an exemplary networking environment 800 wherein aspects of the claimed subject matter can be employed. Moreover, the exemplary networking environment 800 may be used to implement a system and method that resolves a crowdsourced classification problem.

The networking environment 800 includes one or more client(s) 802. The client(s) 802 can be hardware and/or software (e.g., threads, processes, computing devices). As an example, the client(s) 802 may be client devices, providing access to server 804, over a communication framework 808, such as the Internet.

The environment 800 also includes one or more server(s) 804. The server(s) 804 can be hardware and/or software (e.g., threads, processes, computing devices). The server(s) 804 may include a server device. The server(s) 804 may be accessed by the client(s) 802.

One possible communication between a client 802 and a server 804 can be in the form of a data packet adapted to be transmitted between two or more computer processes. The environment 800 includes a communication framework 808 that can be employed to facilitate communications between the client(s) 802 and the server(s) 804.

The client(s) 802 are operably connected to one or more client data store(s) 810 that can be employed to store information local to the client(s) 802. The client data store(s) 810 may be located in the client(s) 802, or remotely, such as in a cloud server. Similarly, the server(s) 804 are operably connected to one or more server data store(s) 806 that can be employed to store information local to the servers 804.

Figure 9:
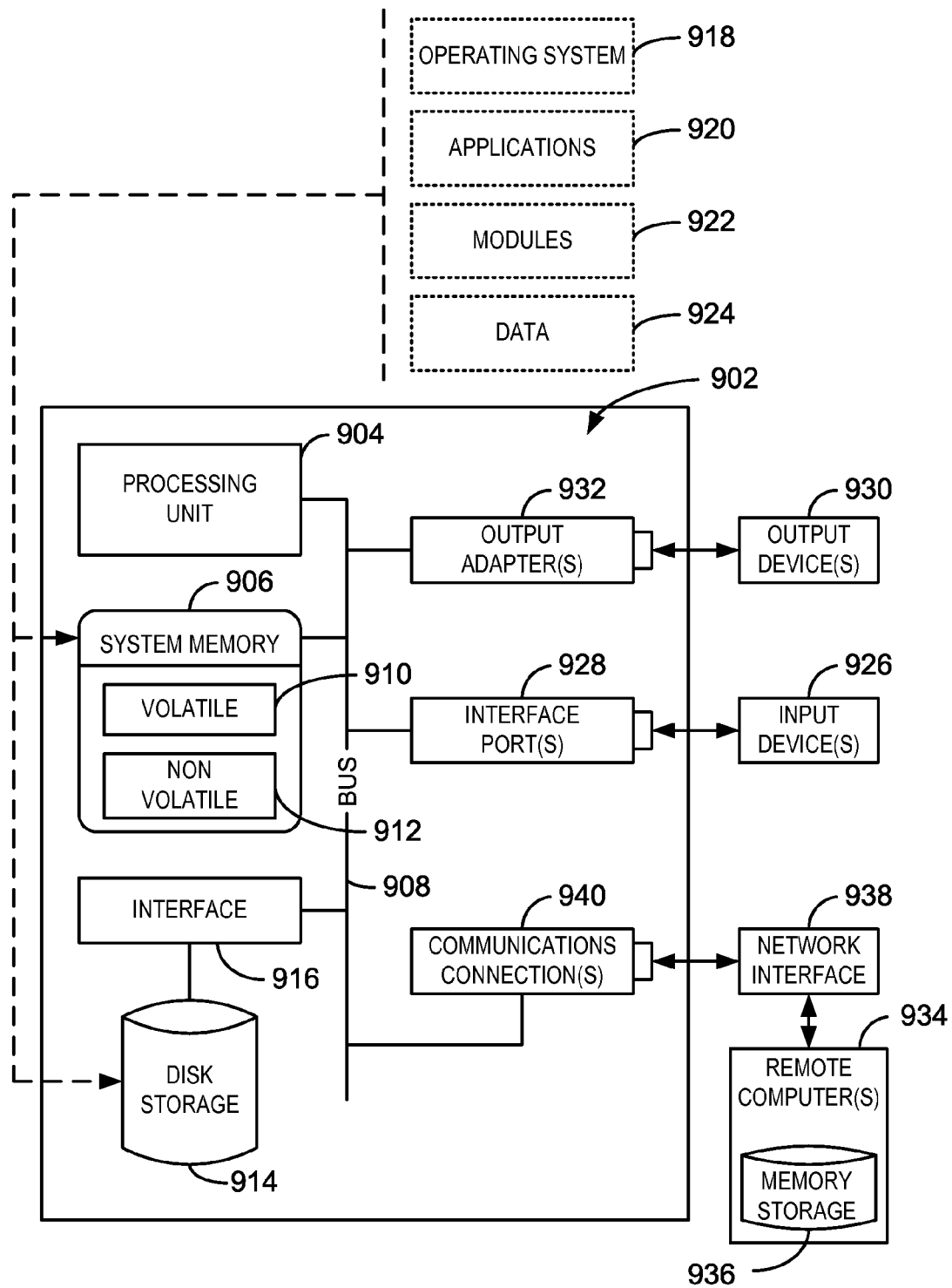
FIG. 9 is a block diagram of an exemplary operating environment for implementing various aspects of the claimed subject matter.

With reference to FIG. 9, an exemplary operating environment 900 is shown for implementing various aspects of the claimed subject matter. The exemplary operating environment 900 includes a computer 902. The computer 902 includes a processing unit 904, a system memory 906, and a system bus 908.

The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures known to those of ordinary skill in the art. The system memory 906 includes computer-readable storage media that includes volatile memory 910 and nonvolatile memory 912.

The basic input/output system (BIOS), containing the basic routines to transfer information between elements within the computer 902, such as during start-up, is stored in nonvolatile memory 912. By way of illustration, and not limitation, nonvolatile memory 912 can include read only memory (ROM), programmable ROM (PROM), electrically programmable ROM (EPROM), electrically erasable programmable ROM (EEPROM), or flash memory.

Volatile memory 910 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 902 also includes other computer-readable media, such as removable/non-removable, volatile/non-volatile computer storage media. FIG. 9 shows, for example a disk storage 914. Disk storage 914 includes, but is not limited to, devices like a magnetic disk drive, floppy disk drive, tape drive, Jaz drive, Zip drive, LS-100 drive, flash memory card, or memory stick.

In addition, disk storage 914 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used such as interface 916.

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902.

System applications 920 take advantage of the management of resources by operating system 918 through program modules 922 and program data 924 stored either in system memory 906 or on disk storage 914. It is to be appreciated that the claimed subject matter can be implemented with various operating systems or combinations of operating systems.

A user enters commands or information into the computer 902 through input device(s) 926. Input devices 926 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and the like. The input devices 926 connect to the processing unit 904 through the system bus 908 via interface port(s) 928. Interface port(s) 928 include, for example, a serial port, a parallel port, a game port, and a universal serial bus (USB).

Output device(s) 930 use some of the same type of ports as input device(s) 926. Thus, for example, a USB port may be used to provide input to the computer 902, and to output information from computer 902 to an output device 930.

Output adapter 932 is provided to illustrate that there are some output devices 930 like monitors, speakers, and printers, among other output devices 930, which are accessible via adapters. The output adapters 932 include, by way of illustration and not limitation, video and sound cards that provide a means of connection between the output device 930 and the system bus 908. It can be noted that other devices and systems of devices provide both input and output capabilities such as remote computer(s) 934.

The computer 902 can be a server hosting various software applications in a networked environment using logical connections to one or more remote computers, such as remote computer(s) 934. The remote computer(s) 934 may be client systems configured with web browsers, PC applications, mobile phone applications, and the like.

The remote computer(s) 934 can be a personal computer, a server, a router, a network PC, a workstation, a microprocessor based appliance, a mobile phone, a peer device or other common network node and the like, and typically includes many or all of the elements described relative to the computer 902.

For purposes of brevity, only a memory storage device 936 is illustrated with remote computer(s) 934. Remote computer(s) 934 is logically connected to the computer 902 through a network interface 938 and then connected via a wireless communication connection 940.

Network interface 938 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 940 refers to the hardware/software employed to connect the network interface 938 to the bus 908. While communication connection 940 is shown for illustrative clarity inside computer 902, it can also be external to the computer 902. The hardware/software for connection to the network interface 938 may include, for exemplary purposes only, internal and external technologies such as, mobile phone switches, modems including regular telephone grade modems, cable modems and DSL modems, ISDN adapters, and Ethernet cards.

An exemplary processing unit 904 for the server may be a computing cluster comprising Intel® Xeon CPUs. The disk storage 914 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for translating natural language descriptions to programs in a domain-specific language for spreadsheet documents, the method comprising:
   generating a model of a spreadsheet document generated by a spreadsheet program, comprising a column description for each column, and one or more types associated with each column;
   identifying phrases in the natural language description that match with a column name or a data value in a column based on the model;
   generating a normalized description for the original description based on the identified phrases;
   generating a plurality of programs in an underlying domain-specific language from the normalized description by applying a combination of rule-driven translation and type-based program synthesis; and
   ranking the generated programs in an order that reflects their likelihood.

2. The method recited in claim 1, comprising presenting the programs in association with the spreadsheet document.

3. The method recited in claim 2, comprising presenting an explanation of each of the programs in association with the potential expression.

4. The method recited in claim 3, wherein the explanation comprises a paraphrasing of each of the programs.

5. The method recited in claim 3, wherein the explanation comprises a highlighting of a column whose values are operated on by the potential program.

6. The method recited in claim 3, comprising executing the potential program on the spreadsheet document, wherein the explanation comprises a result of executing the potential program.

7. The method recited in claim 1, wherein the underlying domain-specific language includes filtering operations, reduce operations, arbitrary composition of these operations, and support for operations in specific domains.

8. The method recited in claim 1, wherein the normalization requires removing stop words and replacing phrases that match with column names and data-values by appropriate parameter place-holders.

9. The method recited in claim 1, comprising:
   determining that the natural language description does not specify a parameter a sub-program is associated with in one of the programs, wherein the parameter comprises a data type, and wherein the spreadsheet document comprises no more than one column of the data type; and
   associating the parameter with the one column.

10. The method of claim 1, comprising providing feedback on the natural language description, wherein the feedback comprises information relevant to a correction to the natural language description.

11. A system for translating natural language descriptions to programs in spreadsheet documents, the system comprising:
   a processing unit; and
   a system memory, wherein the system memory comprises code configured to direct the processing unit to:
   generate a model of a spreadsheet document generated by a spreadsheet program, comprising a column description for each column, and one or more types associated with each column;
   generate a plurality of potential programs in a domain-specific language after normalizing the natural language description based on the model, and using a combination of rule-based translation and type-based program synthesis;
   present a first of the potential programs based on a likelihood the one potential program is associated with the intended program; and
   present a second of the potential interpretations in response to a request from a spreadsheet user.

12. The system recited in claim 11, comprising code configured to direct the processing unit to identify, in a client interface, stop words that are not included in the model.

13. The system recited in claim 11, comprising code configured to direct the processing unit to present an explanation of each of the potential programs in association with the potential program.

14. The system recited in claim 11, wherein the explanation comprises one of:
   a natural language paraphrasing of the potential program; or
   a highlighting of a column whose values are operated on by the potential program.

15. The system recited in claim 11, comprising code configured to direct the processing unit to execute the potential program on the spreadsheet document, wherein the explanation comprises a result of execution of the potential program.

16. The system recited in claim 11, wherein the normalization process comprises one of:
   removing a stop word; or
   replacing the phrase that refers to a column name of the spreadsheet document or a data value in the spreadsheet document by parameterized place-holders.

17. The system recited in claim 11, comprising code configured to direct the processing unit to:
   determine that the natural language description does not specify a parameter a sub-program associated with one of the potential programs, wherein the parameter comprises a data type, and wherein the spreadsheet document comprises no more than one column of the data type; and
   associate the parameter with the one column.

18. One or more computer-readable storage media for translating natural language descriptions to expressions in spreadsheet documents, the computer-readable storage media comprising code configured to direct a processing unit to:
   generate a model of a spreadsheet document generated by a spreadsheet program, comprising a column description for each column of the spreadsheet document, and one or more types associated with each column;
   generate a plurality of potential programs in an underlying domain-specific language from the natural language description by first normalizing the description based on the model, and then using a translation system that uses a combination of rule-based translation and type-based program synthesis; and
   present a first of the potential interpretations based on a likelihood the one potential interpretation is associated with the intended program; and
   present a result of the program in association with a selection of one or more columns, wherein the columns are associated with the program, and wherein the result is based on the columns.

19. The one or more computer-readable storage media recited in claim 18, wherein the normalization process comprises one of:
   removing a stop word; or
   replacing the phrase that refers to a column name of the spreadsheet document or a data value in the spreadsheet document by parameterized place-holders.

20. The one or more computer-readable storage media recited in claim 18, comprising code configured to direct the processing unit to:
   determine that the domain-specific language description does not specify a parameter for a sub-program associated with one of the potential programs, wherein the parameter comprises a data type, and wherein the spreadsheet document comprises no more than one column of the data type; and
   associate the parameter with the one column.

* * * * *